Figure 1:
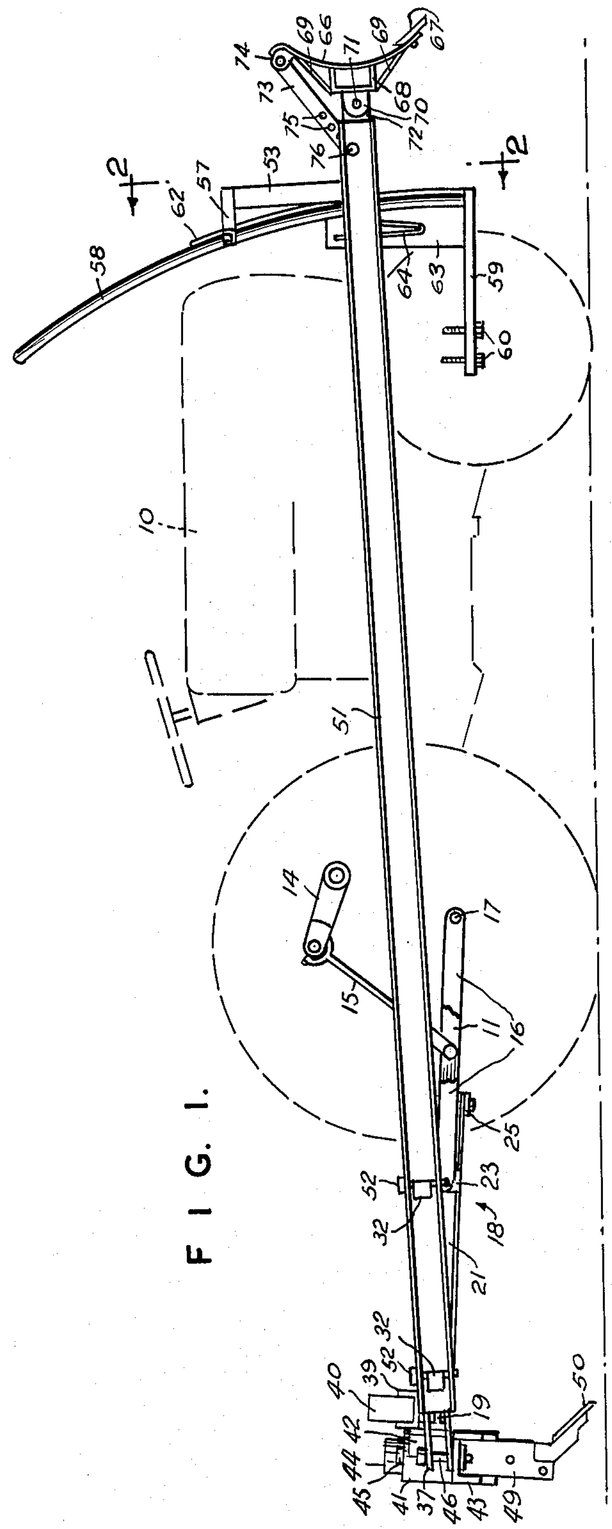

July 12, 1966 C. H. ROLFE 3,260,003

BULLDOZER OR LIKE IMPLEMENT FOR ATTACHMENT TO A TRACTOR

Filed June 4, 1963

2 Sheets-Sheet 1

BULLDOZER OR LIKE IMPLEMENT FOR ATTACHMENT TO A TRACTOR

Filed June 4, 1963

INVENTOR
COLIN HENRY ROLFE
BY Richards & Geier
ATTORNEYS

United States Patent Office 3,260,003

Patented July 12, 1966

3,260,003

BULLDOZER OR LIKE IMPLEMENT FOR ATTACHMENT TO A TRACTOR

Colin Henry Rolfe, Wheelholme, Springsure, Queensland, Australia

Filed June 4, 1963, Ser. No. 285,522
2 Claims. (Cl. 37—144)

This invention relates to a mounting frame for a bulldozer blade or other working head, particularly suited for mounting on a tractor.

The term "working head" in this specification means any tool operable by a mobile vehicle which exerts a pushing or pulling action. The term includes bulldozer earth scoops and tree pushers.

It is well-known to provide mounting frames for such working heads adapted to be fitted to an existing tractor. In such apparatus the working head is carried by a pair of carrying arms disposed to either side of the tractor and extending in front thereof, where they are rigidly interconnected, the carrying arms being pivoted at their rear ends to either side of the tractor, usually between the axles of front and rear wheels, and being adapted to be pivotally raised and lowered by an arrangement of hydraulic rams.

It will be appreciated that a good deal of time, trouble and expense is involved in fitting such apparatus to an existing tractor, since heavy mounting assemblies must be fitted to the tractor to provide the pivotal connections of the carrying arms, and hydraulic rams must be provided, mounted on the tractor, and connected to the carrying arms, to raise the working head.

A further disadvantage in such an implement is that its center of gravity is well forward in relation to the tractor to which it is fitted. Consequently, the front wheels of the tractor are heavily loaded, and the steering and maneuverability of the tractor are impaired. Moreover, the traction of the tractor is likely to be inadequate unless the tractor is weighted at the rear to increase the load on the drive wheels.

A still further disadvantage in such equipment is that a working head carried by such a mounting frame penetrates downwardly into the soil only under the influence of its own weight, and consequently is apt to be made unduly heavy.

One of the objects of the present invention is to provide for a tractor a mounting frame which may be very quickly and easily applied to or removed from a tractor. Another object of the invention is to provide such apparatus which requires no additional hydraulic equipment on the tractor, but is operable by means of the hydraulic three-point suspension gear with which a tractor is ordinarily fitted. A further object of the invention is to provide such apparatus in which the center of gravity is near to the axle of the drive wheels of the tractor, so that the traction of the tractor is increased and the ability of the tractor to work in difficult conditions is improved. A still further object of the invention is to provide such apparatus in which the working head may be depressed to working position by power means and not only by its own weight for good and quick penetration into the ground. Yet another object of the invention is to provide such apparatus in which cultivator tines and other tools for operation at the rear of the tractor may be applied thereto. Still further objects of the invention are to provide such apparatus which is simple and economical to manufacture, and sturdy and durable in use.

Figure 2:
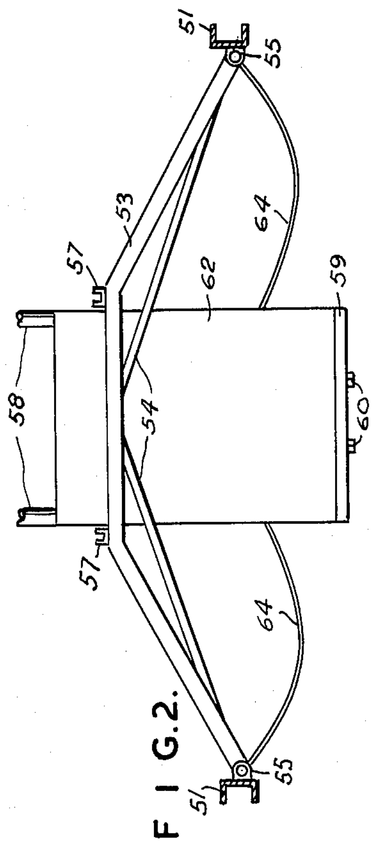
Figure 6:
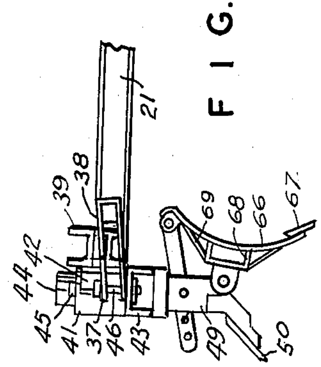
Figure 3:
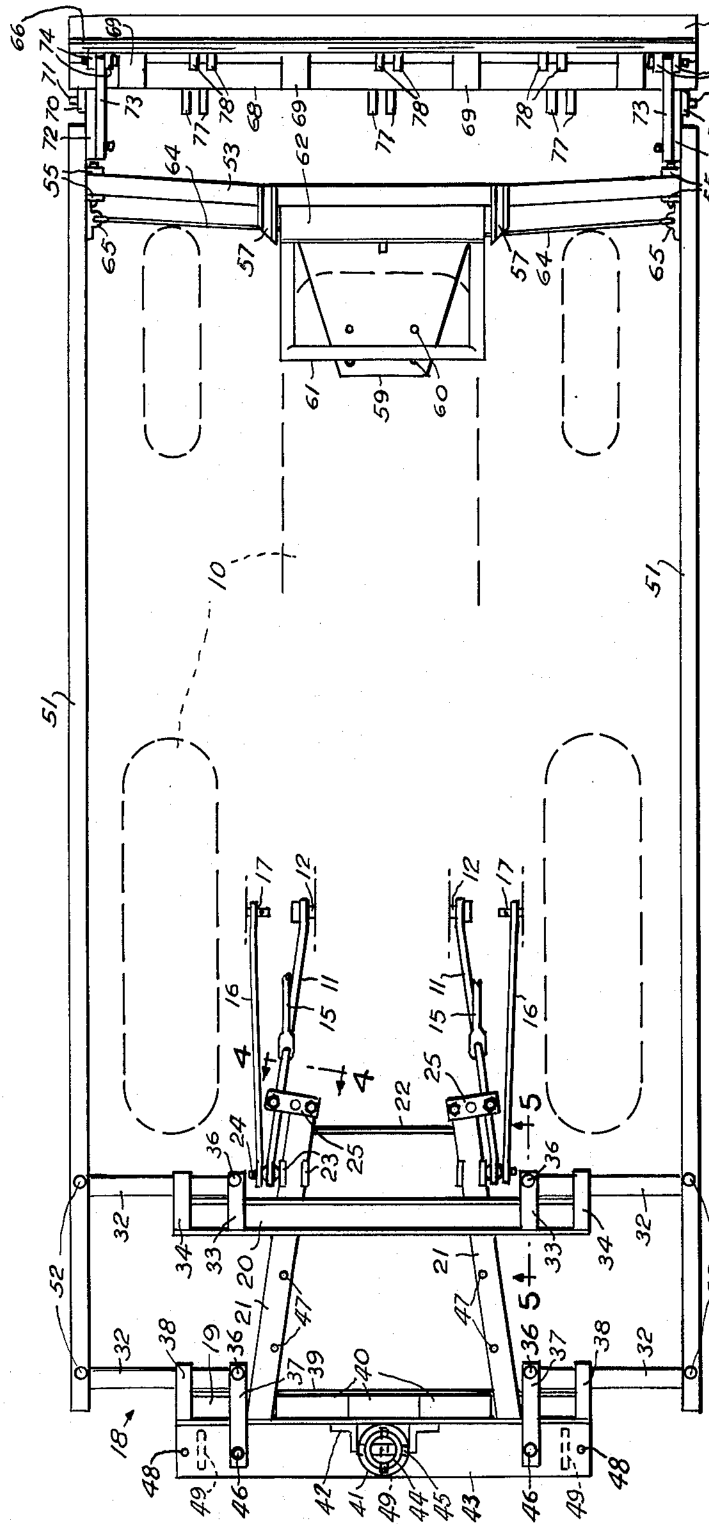
Figure 4:
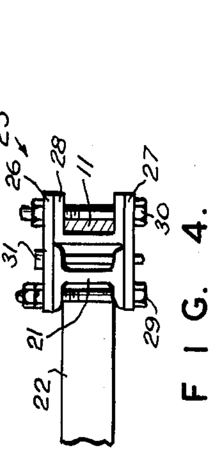
Figure 5:
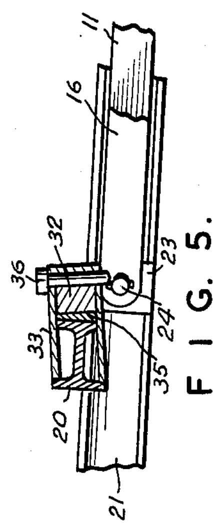

In order that the invention may be readily understood and carried into practical effect, reference is now made to the accompanying drawings, wherein:

FIG. 1 is a side elevational view of a mounting frame according to the invention, applied to a tractor indicated in broken outline only, FIG. 2 is a sectional view along line 2—2 in FIG. 1,
FIG. 3 is a plan view of the apparatus shown in FIG. 1,
FIG. 4 is a sectional view along line 4—4 in FIG. 3,
FIG. 5 is a sectional view along line 5—5 in FIG. 3, and FIG. 6 is a side elevational view of the rear part of the apparatus with side arms removed, and the bulldozer blade re-fitted as a grader blade.

The mounting frame shown in the drawings is made for attachment to a tractor of conventional type, indicated in broken outline at 10, and fitted in the usual way with three-point hydraulic suspension gear, including a pair of lifting arms 11, fulcrumed at their front ends at 12, and adapted to be raised or lowered by a pair of hydraulically operated lifting levers 14 connected by connecting rods 15 to the lifting arms 11. A third central stabilizing arm which forms part of the three point suspension gear of the tractor, and which is removable, is not required in the present invention and is omitted from the drawings.

Associated with each of the lifting arms 11 is a stabilizer bar 16, of about the same length as the lifting arm, and pivoted at its front end, at 17, on the tractor 10. The pivots 17 of the stabilizer bars 16, and the fulcrums 12 of the lifting arms 11 lie in the same transverse substantially horizontal straight line, the stabilizer bar pivots being disposed outwardly of the lifting arm fulcrums.

The lifting arms 11 and the stabilizer bars 16 are releasably connected to a rear frame indicated generally at 18, and including a rear beam 19 and a front beam 20, these beams being parallel and transverse, and both being of I-section. The two beams 19 and 20 are rigidly interconnected by a pair of I-section bearers 21, which are forwardly convergent so as to be parallel to the rearwardly divergent lifting arms 11, and which extend for some distance forwardly of the front beam 20 and are reinforced by a lateral brace 22. Each of the bearers 21 has its flanges at top and bottom and to both sides cut away to receive the top and bottom parts of a pair of parallel upright plates 23, which are welded in place, a pivot pin 24 being fitted and welded through registering apertures in the two plates and the web of the bearer 21, and extending outwardly of the bearer. A lifting arm 11 and its associated stabilizer bar 16, both apertured at the rear, are both removably engaged at their rear ends on each of the pivot pins 24.

Each lifting arm 11 is releasably secured to a bearer 21 by a swinging clamp 25 consisting of a top plate 26 and a bottom plate 27 welded above and below a channel 28. The top and bottom plates 26 and 27 pass above and below the front extremity of the bearer 21 and are pivoted thereto by a bolt 29. About this bolt, the clamp may be swung so that the channel 28 engages the lifting arm 11, which may then be retained in the channel by a retaining bolt 30 passed through corresponding top and bottom apertures through the top and bottom plates and top and bottom flanges of the channel. The clamp may then be restrained against swinging movement by a locking pin 31 passed through corresponding apertures in the top and bottom plates 26 and 27 and in top and bottom flanges of the interposed bearer 21.

The rear frame 18, which includes rear and front beams 19, 20 and bearers 21, is thus rigidly connected to lifting arms 11 for unitary angular movement with them, by means of the spaced connections at pins 24 and clamps 25.

The provision of pins 24 rather than a clamp or other non-pivotal connection at this position facilitates removal of frame 18 from lifting arms 11 as follows:

Blade 66 is lowered to rest on the ground relieving stress on clamps 25 and enabling them to be easily released. Arms 11 are lowered and frame 18 now pivots on pins 24 until it rests flat on the ground, stress on pins 24 being relieved and enabling them also to be easily removed to detach frame 18 entirely from arms 11. By this means the weight of the frame is supported at every stage of release. To each end of each of the rear and front beams 19 and 20 there is removably secured the inner end of an outwardly extending shock absorber 32, consisting of a more or less square cross-section length of spring steel. To the front beam 20, each of its shock absorbers is secured by a pair of substantially U-shaped holders 33 and 34, the flanges to the front of the beam being somewhat cut away to receive the arms of each holder which, as shown in FIG. 5, is tilted somewhat relative to the beam. Each of the holders 33 and 34 is welded in place, and welded or otherwise secured in front of the beam is a wedge-shaped spacer piece 35. Each shock absorber 32 may be slidably fitted in its holders 33 and 34, adjacent to the spacer 35, and releasably held in place by a locking pin 36 passed down through corresponding holes in the top and bottom of the holder 33, and through a notch formed from the front of the shock absorber.

To each end of the rear beam 19, a shock absorber 32 is secured in like manner by means of two holders 37 and 38 the outer holder 38 being similar to the holder 34 before described, the inner holder 37 differing from holder 33 of the front beam only in that its two arms are elongated, extending rearwardly of the rear beam, and formed with corresponding holes near its rear extremities. Each inner holder 37, like the corresponding holder 33, is fitted with a locking pin 36 engaging in a notch in a shock absorber 32.

Between the rear ends of the bearers 21, a channel 39 is secured upon the rear beam 19, to reinforce it, and to provide a holder for counter-weights 40.

A cylindrical sleeve 41 is welded in upright position behind the middle of the rear beam 19 and channel 39, and reinforced by angle brackets 42. A tool bar 43, consisting of an inverted channel, has a cylindrical axis tube 44 welded to and extending up from its middle, this tube being rotatably engaged in the sleeve 41, and restrained against detachment from the sleeve by a heavy pin 45 passed diametrically through the axis tube above the sleeve 41.

The tool bar 43 is held against rotation from its transverse position, as shown, by a pair of locking pins 46 passed down through the holes in the ends of the two shock absorber holders 37 and engaging in registering holes in the tool bar. If these pins 46 are removed, the tool bar may be swung about the axis of the tube 44, and retained in an angular setting by engaging one of the locking pins 46 through any one of holes 47 in the two bearers 21 and one of the holes in the tool bar shown in the drawings as engaged by locking pins 46, or in one of holes 48 near the ends of the tool bar.

Welded under the tool bar are three downwardly extending tines 49 in equally spaced arrangement, each being fitted with a reversible tine blade 50.

The apparatus includes a pair of parallel side arms 51 which are sturdy channels adapted to be located to either side of the tractor 10, and which are connected at their rear parts to the shock absorbers 32 of the rear frame 18. The outer ends of the shock absorbers to each side of the rear frame pass closely through substantially square holes in the web of one side arm 51, and are locked therein by locking pins 52 passed through corresponding apertures in the upper and lower flanges of the channel of the side arm, and through a registering notch formed from the front of the shock absorber.

The side arms 51 are interconnected in front of the tractor 10 by a front frame 53, which is arched and reinforced by braces 54 (FIG. 2). The ends of the front frame are removably pinned between pairs of apertured lugs 55 secured to the side arms 51. From the upper part of the front frame 53, a pair of guide arms 57 extend rearwardly, and to either side of a pair of guide standards 58 disposed in front of the tractor radiator. These guide standards are secured to and extend upwardly from the front of a mounting plate 59, the rear part of which is secured under the front part of the chassis of the tractor by bolts 60. In side view, the guide standards are curved to arcs centered on a line through the fulcrums 12 of the lifting arms 11, and the standards are rigidly interconnected at their upper ends by a crosspiece 61. A radiator shield plate 62 is secured across the lower parts of the standards 58. A cable bracket 63 extending upwards from the middle front part of the mounting plate 59 has a cable 64 passed through a hole therein, the ends of this cable being releasably connected to brackets 65 on the two side arms 51. This cable serves to limit the upward or downward pivoted movement of the side arms 51.

A bull-dozer blade 66 is mounted on the front ends of the side arms 51. The blade, with a reversible cutting edge 67, is mounted on a transverse channel 68 and is reinforced at the back by stays 69. At each side, pairs of apertured lugs 70 extend rearwardly from the channel 68, and are pivoted by axis pins 71 to apertured lugs 72 secured to and extending forwards of the side arms 51. The bull-dozer blade may be held in desired angular adjustment by a pair of stays 73 pivoted at their front and upper ends between pairs of lugs 74 behind the top of the blade, and formed with series of holes 75, any selected ones of which may be engaged by pins 76 passing through the side arms 51.

The bulldozer blade is also provided with three further pairs of apertured lugs 77 similar to lugs 70, and located correspondingly with the three tines 49 of the tool bar 43; and with three corresponding pairs of apertured lugs 78 similar to lugs 74.

The apparatus is so made and counterbalanced by the weights 40 that it tends to drop at the rear, pivoting about an axis through the fulcrums 12 of the lifting arms 11. However, the lifting arms may be raised by the hydraulically operated lifting levers 14, to cause the bulldozer blade 66 to be lowered to operative position, and to be forced positively into the ground, to give good penetration. Since the center of gravity of the implement is very near the axis of the axle of the rear or drive wheels, the weight of the implement greatly improves the traction of the tractor, and it will be found that the tractor may handle the bulldozer in the normal working speed gears with little if any wheel spin even on loose dry ground, and will be capable of pushing loads of soil up steep loose banks. Furthermore, because of the excellent traction and the low loading on the front wheels of the tractor, the tractor will be able to reverse up steep banks and therefore may be used for work on creek crossings and in other areas which cannot normally be worked effectively by conventional bulldozers. Additional advantages are that the tractor with the implement mounted can be used effectively on boggy ground, and because of the low loading of the front wheels, the tractor may be easily steered and maneuvered. The provision of the shock absorbers 32 will be found very advantageous.

Although the implement as shown in FIGS. 1 and 3 may be used alternatively for bull-dozing with the blade 66, or cultivating with the tines 49, if desired, the side arms 51 may be removed, together with the working head, the front frame 53 and the shock absorbers 32, leaving only the rear frame 18. The pivotal arrangement of the tool bar 43 enables the tines to be set in any of several different arrangements. Moreover, if the tool bar 43 be reversed by being swung through 180°, then, as shown in FIG. 6, the bulldozer blade 66 may be fitted to serve as a grader blade, the pairs of lugs 77 behind the blade 66 being pivoted to appropriate holes in the three tines 49, the stays 73 being disconnected from the lugs 74 and refitted to lugs 78 so that the stays may be bolted in desired adjustment to the tines 49, to give the blade 66 the appropriate angular setting.

It will be seen that the mounting frame including the front frame 53, rear frame 18 and side arms 51 is operatively attached to the tractor lifting arms 11 only and is not pivoted elsewhere to the tractor. It can therefore be used without any substantial modification to the tractor, is very easy to attach or detach, and is positively driven to working position (i.e. with blade 66 engaging the ground) by raising lifting arms 11.

What I claim is:

1. A tractor-mounted implement including: a tractor; rearwardly extending power-operated lifting arms on said tractor; a first frame including a pair of carrying arms rigidly connected together and lying one on either side of said tractor; a working head mounted on said first frame in front of said tractor; a rear frame rigidly attached for unitary movement with said lifting arms; a detachable but rigid connection between said first frame and said rear frame, a transverse tool bar pivotally attached to said rear frame; spaced tool attachment means on said tool bar; and correspondingly spaced attachment means on said working head suited to engage said tool attachment means.

2. An implement frame for attachment to a tractor including: a pair of carrying arms lying, when said frame is in working position, on either side of said tractor and extending forwardly and rearwardly thereof; a rigid connection between said arms; mounting means for a working head towards the front of said arms; means for attaching the rear of said carrying arms rigidly to rearwardly directed power-operated lifting arms of said tractor; a tool bar pivotally mounted on said rear frame, said tool bar having spaced tool attachment means; and means for retaining said tool bar in any one of a number of selected angular positions.

References Cited by the Examiner

UNITED STATES PATENTS

| | | | |
|---|---|---|---|
| 376,448 | 1/1888 | Nellis | 172—776 |
| 1,535,384 | 4/1925 | Toney | 37—144 |
| 1,831,222 | 11/1931 | Andersen | 37 |
| 2,473,357 | 6/1949 | Blunier | 172—450 X |
| 2,694,267 | 11/1954 | Donnelly et al. | 37—170 |
| 2,749,631 | 6/1956 | Thompson | 37—170 |
| 2,766,965 | 10/1956 | Schaich. | |
| 2,862,315 | 12/1958 | Blanchet | 37—144 |
| 2,883,776 | 4/1959 | Orscheln | 37—144 |
| 2,979,839 | 4/1961 | Hugger | 37—144 |

FOREIGN PATENTS

| | | |
|---|---|---|
| 1,071,026 | 3/1954 | France. |
| 1,096,835 | 1/1961 | Germany. |
| 761,394 | 11/1956 | Great Britain. |

ANTONIO F. GUIDA, *Acting Primary Examiner.*

BENJAMIN HERSH, ABRAHAM G. STONE, *Examiners.*

G. T. MOLLER, W. A. SMITH III, *Assistant Examiners.*